United States Patent [19]

Hoerner

[11] Patent Number: 4,461,413
[45] Date of Patent: Jul. 24, 1984

[54] RETRACTABLE, ARTICULATED CARRIER FOR VEHICLES

[76] Inventor: Griffith L. Hoerner, 2211 Montana Ave., Santa Monica, Calif. 90403

[21] Appl. No.: 495,749

[22] Filed: May 18, 1983

[51] Int. Cl.³ .............................................. B60R 9/06
[52] U.S. Cl. .............................. 224/311; 224/42.03 B; 224/42.08; 224/42.44; 224/314
[58] Field of Search ............... 224/314, 311, 319, 321, 224/330, 309, 329, 42.03 R, 42.03 B, 42.08, 42.44, 310, 42.21; 414/465, 466

[56] References Cited

U.S. PATENT DOCUMENTS

| | | | |
|---|---|---|---|
| 2,772,041 | 11/1956 | Zeabari | 224/42.44 |
| 2,907,483 | 10/1959 | Prag | 224/42.03 R X |
| 2,953,287 | 9/1960 | Werner | 224/42.44 |
| 3,534,892 | 10/1970 | Truelove, Sr. | 224/311 |
| 4,061,257 | 12/1977 | St. Clair | 224/42.08 |
| 4,073,395 | 2/1978 | Clement | 224/42.44 X |
| 4,336,897 | 6/1982 | Luck | 224/42.03 B |

*Primary Examiner*—Steven M. Pollard
*Attorney, Agent, or Firm*—Jay H. Quartz

[57] ABSTRACT

A carrier, e.g., a bicycle carrier, for use with vehicles is described. The carrier, in its bicycle-supporting position, comprises an upright, bicycle-supporting frame which is connected at its lower end to a rearward end of a base frame. The latter extends horizontally across, and is supported on, a rear edge of a trunk and is connected at its forward end to anchoring posts which, in turn, are connected to an inner surface of the trunk (including the trunk lid). Preferably, the referenced carrier components are pivotally connected to each other so that the carrier can be retracted into the trunk either into a folded position or extended along the undersurface of the trunk lid. A modified lock system is provided to normally lock the trunk lid when the carrier is stored within the trunk and to lock the lid against the base frame when the carrier is in its bicycle-supporting position. Preferably, adjustable straps are used to interconnect the top of the bicycle-supporting frame and the forward edge of a trunk lid so that the frame can be raised and lowered incrementally by appropriate adjustment of the straps. Such movement of the bicycle-supporting frame permits the upper end of the latter to be lowered to engage a bicycle and, with bicycle attached, to be rotated upward into its bicycle-supporting position, thereby eliminating the need to physically lift a bicycle up and onto the carrier.

17 Claims, 6 Drawing Figures

RETRACTABLE, ARTICULATED CARRIER FOR VEHICLES

PRIOR ART

A variety of bicycle carriers is presently available for transporting bicycles on automobiles. However, with one exception, all have one characteristic in common. Each is positioned and attached externally to a vehicle. To store these carriers requires removing, i.e., detaching, each from the vehicle and placing it in the trunk where it competes for space with other articles which are placed in the trunk. Many of these carriers even have to be removed before access can be gained to a trunk.

A typical example of presently-available carriers which attach to a trunk deck is described in U.S. Pat. No. 4,085,874, issued Apr. 25, 1978, to J. W. Graber and entitled "Automobile Bicycle Carrier". In addition to having the disadvantage common to all externally-mounted carriers, as noted above, this carrier has feet and hook connections which can mar a vehicle's finish. Additionally, because of the many components which require placement and adjustment, setting up and removing this type of carrier can be time-consuming and difficult for some persons.

The exception alluded to above is described in my U.S. Pat. No. 4,301,956, issued Nov. 24, 1981, and entitled "Retractable Bicycle Carrier For Vehicles". The carrier described therein eliminates some of the disadvantages of the other prior art carriers in that it can be easily set up for bicycle carrying from its stowed position under a trunk lid, it can be easily returned to its stowed position against a trunk lid, it leaves most of the trunk spaced available for cargo, and it permits ready access to a trunk. However, some trunk lids may not provide sufficient support for that carrier which relies primarily on its attachment to a trunk lid for the required support for carrying bicycles. Additionally, trunk lids must be in their open positions when that carrier supports a load, thereby leaving trunk contents exposed.

SUMMARY OF THE INVENTION

The described invention is embodied in a retractable, articulated load carrier for use with vehicles for carrying loads such as bicycles and wheelchairs externally to, and rearwardly of, a vehicle. This carrier is mounted in a stowed position within a vehicle cavity, e.g., a trunk, in a manner such that it can be swung outwardly from its stowed position into a load-carrying position rearwardly of the trunk for carrying a designated load in a stable position rearwardly of the vehicle. More specifically, the load carrier comprises a base frame which, when the carrier is in its load-carrying position, extends rearwardly and transversely of, and rests upon, the upper edge of a rear, trunk-defining wall. The base frame is anchored at its inner end to an interior surface of a trunk-defining panel in a manner which permits the base frame to pivot about the anchoring means so that the base frame can be swung into its load-carrying position across the rear trunk-defining wall or into its stowed position within the trunk. The other end of the base frame is connected to a load-supporting frame which assumes an upright position external to the trunk when in its load-carrying position and which is stowable within the trunk when the carrier is in its stowed position. Locking means are provided to lock a trunk lid against a base frame when the carrier is in its load-carrying position. Additionally, restraining means are preferably employed to attach the upper end of the load-supporting frame when in its upright position to a fixed point on the vehicle forward of the carrier to stabilize the latter.

One advantage which is realized through use of the described carrier is that it is readily stowable within a trunk in a minimum of space thereby leaving the trunk primarily for storage of other goods. Concomitantly, the exterior of the vehicle is left in its normal aesthetically-pleasing form and the trunk entrance is not blocked as it is by many prior art carriers which remain wholly or partially external to a vehicle when not in use. Additionally, the described carrier does not have to be connected and disconnected for use and storage, respectively, as do most prior art carriers. Also, the carrier is stable in its load-supporting position because the trunk lid when locked against the trunk base frame effectively sandwiches the latter between it and the rear, trunk-defining wall to lock the base frame in position and and further serves to counterbalance the load. Furthermore, with the trunk lid in its closed position against the carrier's base frame, one can leave bicycles locked to the carrier because they are then effectively locked to the vehicle. Yet another advantage is that this carrier can be constructed to fit variously-sized trunks thereby making it transferable from vehicle to vehicle in many cases.

Additional advantages result from the use of adjustable straps in combination with a pivotal connection between a load-supporting frame and related base frame. The adjustable strap permits the load-supporting frame to be raised and lowered rotationally about its lower-end pivot point so that its upper end can approach the ground to pick up or deposit loads. This obviates the need to physically lift loads onto or off a carrier as is usually done with prior art carriers. Additionally, adjustable strap arrangements can be selected to provide mechanical advantages greater than 1:1 so that the raising of loads to, and the lowering of loads from, the carrying position can be made even easier, thereby allowing persons who are otherwise unable to utilize a bicycle carrier (or other load carrier) to do so.

DESCRIPTION OF THE PREFERRED EMBODIMENT

In general, the described carrier, when in its load-carrying position external and rearwardly of a vehicle cavity, comprises: a base frame which extends transversely of, and is supported on, the upper edge of the rear, cavity-defining wall so that it has a forward end overhanging the cavity and a rearward end overhanging the vehicle rearend; anchoring means connecting the base frame's forward end to an interior, cavity-defining surface; a generally upright, load-supporting frame connected at its lower end to the base frame adjacent to the latter's rearward end; engagement means carried on the upper end section of the load-supporting frame to engage a load, e.g., a bicycle, and hold it in an elevated position against that frame; and locking means for locking the cavity closure against the base frame forwardly of the load-supporting frame to thereby retain the base frame between the closure and cavity-defining, rear wall as long as the closure is locked in its closed position. Restraining means may also be used to interconnect the upper end of the load-supporting frame with the closure adjacent to the latter's forward edge. Preferably, the connections between the two frames and between the base frame and anchoring means permit pivotal movement between the members of each of these pairs so that the carrier can be folded into a stowed position within the cavity.

In one embodiment, the carrier is anchored to the underside of the cavity closure adjacent to its rearward edge and stows against that underside. In another embodiment, the carrier is anchored to an interior, cavity-defining surface (other than the closure) and the carrier is foldable to a stowed position within the cavity.

In most cases, the closure locking system in place within the vehicle is preferably modified so that maximum advantage can be taken of the existing locking mechanism.

While it is understood that the described carrier can be used to support various loads on a variety of vehicles, the invention will be described with reference to the carrying of a bicycle (and thus as a bicycle carrier) on an automobile.

Figure 1:
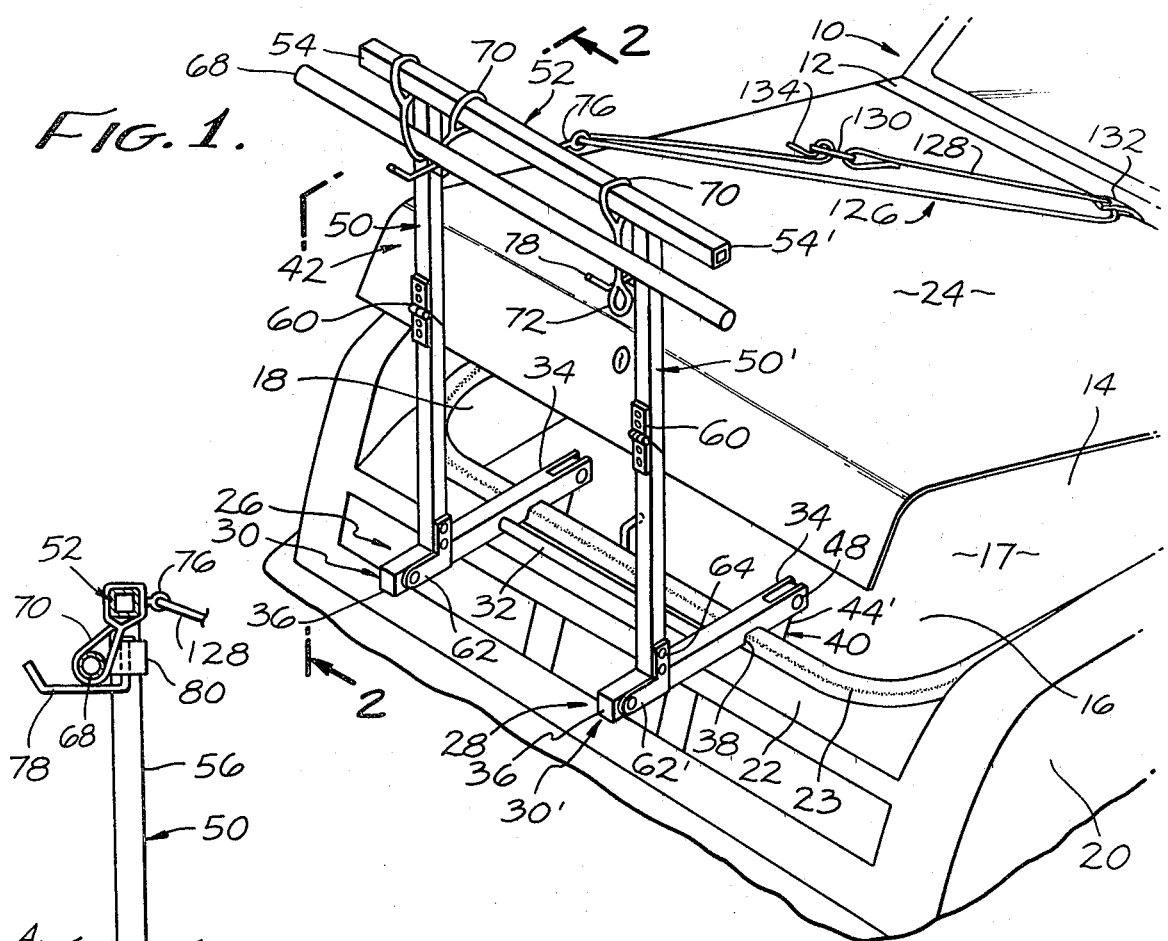
FIG. 1 is a perspective view of one embodiment of the described carrier showing it in its load-carrying position mounted on the rear of an automobile with the trunk partially open.

Referring now to the Drawings and, specifically, to FIG. 1, the numeral 10 designates an automobile having a rear deck 12 in which there is formed an opening 14 for permitting access to a trunk or trunk cavity 16 defined (at least partially) by a floor 17, side walls 18,20, a rear wall 22 having an upper edge 23, and a closure or lid 24 pivotally hinged at its forward edge to the deck and capable of closing the deck opening. The trunk lid 24 may be locked in a closed position in various ways as is well known.

Turning now to the embodiment of this invention which is shown in FIG. 1 in its load-carrying position, the numeral 26 designates an articulated carrier which comprises a generally horizontally-disposed, intermediate base frame 28 which extends transversely of, and rests upon, i.e., is supported by, the trunk rear wall 22 at the latter's upper edge 23. The base frame 28, in turn, comprises one or more beams 30,30' which may be interconnected for added strength and rigidity by a brace 32 shown in FIG. 1. The beams 30,30' are spaced apart and essentially parallel to each other. Each beam 30 has a forward end 34 extending forwardly of the trunk rear wall 22 and overhanging the trunk cavity 16 and each has a rearward end 36 extending rearwardly of the rear wall to overhang the rear end of the automobile 10. To facilitate closing of the trunk lid 24, each beam 30,30' is preferably formed with a downwardly-opening, transverse slot 38 adapted to receive the upper edge 23 of the trunk rear wall 22.

The carrier 26 further comprises anchoring means 40 and a bicycle-supporting frame 42 connected at opposite ends of the base frame 28 to the latter. The anchoring means comprises upstanding, rigid posts 44,44' each of which is connected at its upper end to the forward end 34 of one of the beams 30 and at its lower end to the interior surface of a cavity-defining wall, e.g., the rear wall 22, or to the floor 17. Bolts 46 may be used to connect the anchor posts 44,44 to the rear wall 22. Connection of each anchoring post 44,44' to one of the beams 30,30' may be detachable, e.g., by using threaded fasteners to produce locked joints, so that the base frame 28 can be readily disconnected from the anchoring posts and either placed within the trunk cavity 16 apart from the anchoring means 40 or stored separately from the automobile 10. However, it is presently preferred to pivotally interconnect the base frame 28 and anchoring posts 44,44' so that the carrier 26 can be folded and stored within the trunk 16 as will be described. To that end, a pin 48 is inserted through aligned holes (not shown) in the paired anchoring posts 44,44' and beams 30,30'. The resulting joints can be made detachable or permanent.

The bicycle-supporting frame 42 comprises at least one and, preferably, two upstanding legs 50,50' which are (here) essentially parallel to each other and which are spaced apart a distance equal to that of the base frame beams 30,30' so that the lower ends of the legs can rest on those beams. Interconnecting and extending laterally beyond the legs 50,50' at their upper ends is a cross member 52 having lateral extensions 54,54'. The cross member 52 provides rigidity to the bicycle-supporting frame 42 as well as a support from which bicycles can be suspended.

For ease of storing the carrier 26 within the trunk 16, it is preferred to form the legs 50,50' in segments 56,58 with hinges 60 rotatably interconnecting the segments. However, the legs 50,50' could be formed in telescoping segments with, e.g., removeable pins insertable in aligned holes in the segments when extended to form the legs.

As noted, the lower ends of the legs 50,50' abut and rest on the rigid beams 30,30'. Each such abutting pair is interconnected using a pair of L-shaped connector plates 62,62' disposed laterally of the legs 50,50'. One arm of each plate 62,62' is secured to the lower end of one of the legs 50,50', e.g., by screws 64, to prevent rotation of the leg relative to that arm, whereas the other arm is pivotally connected to the adjoining beam 30,30' adjacent to the latter's rearward end 36 by, e.g., a pin 66. The length of the pivoted arm is sufficient is sufficient to permit folding of the carrier 26 as will be described.

The carrier may be made from various materials such as wood, plastic, and metal, e.g., aluminum, and the cross-sectional shapes of its components may vary with circular, square and rectangular shapes being useful.

Figure 2:
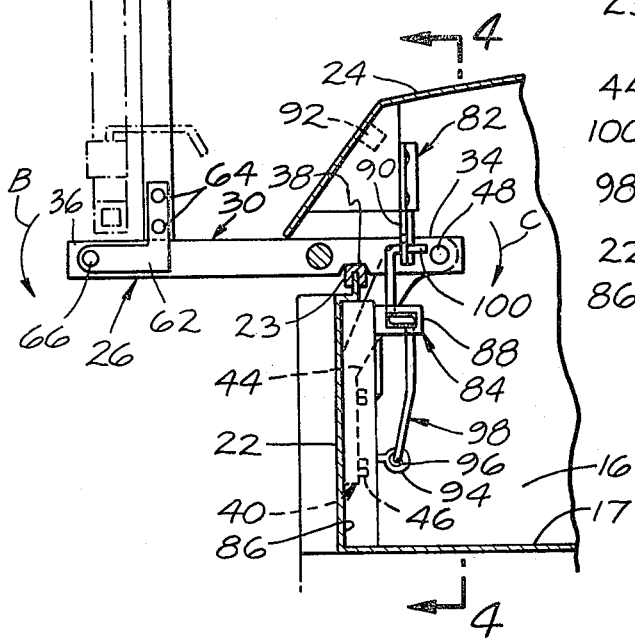
FIG. 2 is a side elevational, sectioned view of the carrier of FIG. 1 taken along the view lines 2—2 of FIG. 1, but with the trunk lid in closed position and with the addition of supporting brackets.

To suspend bicycles, represented by a top tube 68 in FIGS. 1 and 2, flexible hangars 70 may be employed by securing one end of each to the support-frame, cross member 52 between the legs 50,50', encircling the head tube, and slipping a loop 72 in the other end over one of the lateral extensions 54,54' of the cross member as is shown (by one hangar) in FIG. 1.

Figure 5:
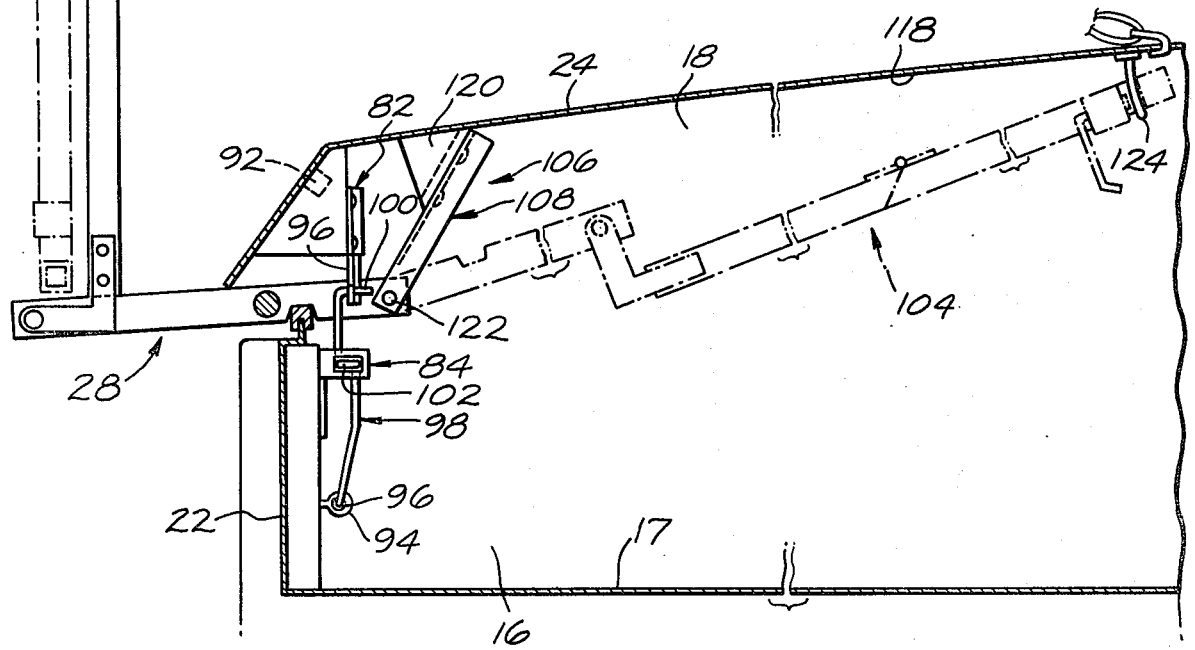
FIG. 5 is a sectional, side elevational view of a vehicle trunk showing a second embodiment in its bicycle-carrying position and also showing it, in dotted outline, in its nesting position against the underside of a trunk lid.

To stabilize the bicycle support frame 42, an extensible cord 74 may be used by attaching its one end to an eye bolt 76 secured to the cross member 52 and its other end to the forward edge of the trunk lid 24 (see FIG. 5).

In some cases, it may be desireable to provide the bicycle-supporting frame 42 with arms 78 for facilitating the carrying of multiple bicycles simultaneously. To prevent interference with the foldable characteristic of the preferred embodiment 26, the arms 78 are mounted on the sides of the legs 50,50' as shown, e.g., in FIG. 2 where the numeral 80 designates a hinge plate secured to the inside of the leg 50. Retained by, and free to rotate within, the hinge plate 80 is one arm 78. The latter 78 can be stored by rotating it into the plane of the legs 50,50' or it can be rotated rearwardly to a position approximately at right angles to that plane to support (the top tubes 68 of) bicycles thereon. The other leg 50' can be similarly provided with an arm.

Figure 3:
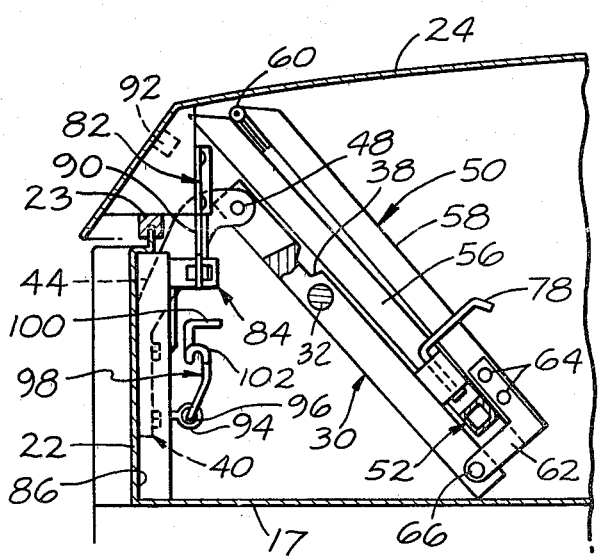
FIG. 3 is a partial sectional view similar to that of FIG. 2, but showing the carrier in its stowed position within an automobile trunk.

Referring now to FIGS. 1-3, the storage of the carrier will now be described. Starting with the bicycle-carrying position of FIG. 1 and with the trunk lid 24 open and the extensible cord removed, the upper section of each leg 50,50' is rotated rearwardly and downwardly as shown by the arrow A in FIG. 2 to juxtapose the rear faces of each pair of leg segments 56,58 in confronting relation to each other as shown in dotted outline in FIG. 2. Then the folded bicycle-supporting frame 42 is rotated around the rearward ends 36 of the base frame beams 30,30' (indicated by the arrow B) while the base frame itself is rotated at its forward end 34 about the upper ends of the anchoring posts 44,44' (indicated by the arrow C). Rotation of the carrier components is continued until the stowage position is reached as indicated in FIG. 3. Erection of the carrier 26 from its stowed position to that of FIG. 1 is the reverse of the foregoing procedure.

When the carrier 26 is in its bicycle-supporting position, it is preferred to lock the trunk lid 24 in a closed position to thereby lock the carrier to the vehicle 10. In most (if not all) cases, the thickness of the beams 30,30' prevents interconnection of the components of the vehicle's locking mechanism. Nevertheless, it is preferred to use as much of a vehicle's locking mechanism as possible so that lock modifications are minimized. To that end, there is now described a modified lock for use with vehicles incorporating apertured lugs as part of the trunk mechanism.

Figure 4:
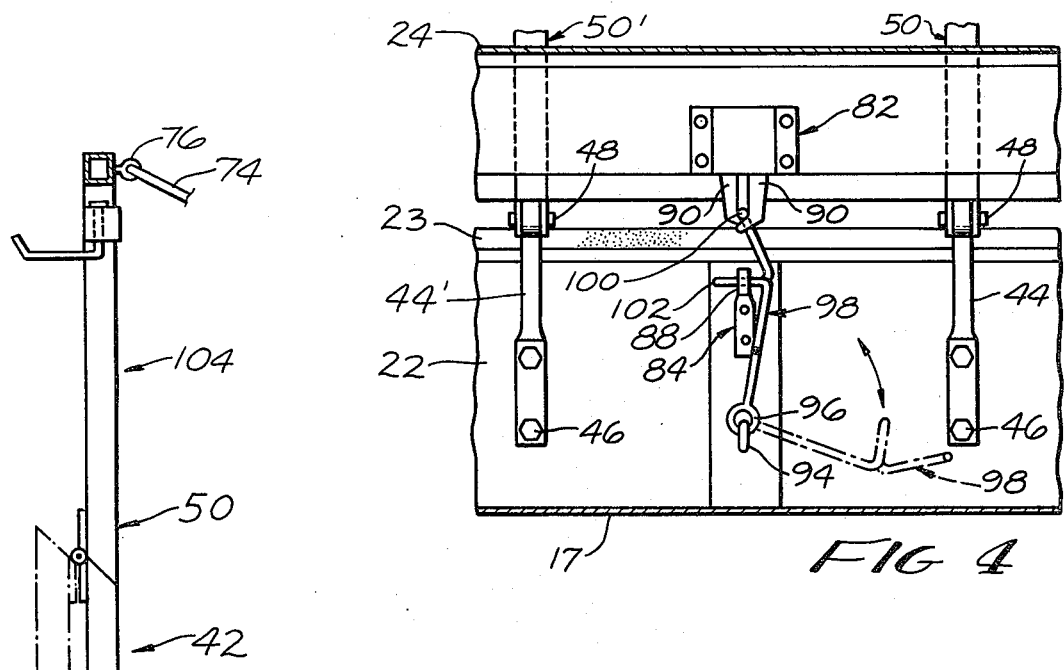
FIG. 4 is a partial, elevational view taken along the view lines 4—4 of FIG. 2 showing a modified lock mechanism for use with the described carrier.

Referring to FIGS. 2-4, the automobile's lock mechanism 82 comprises a lug 84 projecting from a trunk interior surface 86. At its upper end, the lug 84 forms a ring 88 for engagement by reciprocable jaws 90 mounted below and depending from the trunk lid 24. The jaws 90 are opened or closed by a conventional key (not shown) which is insertable into a cylinder 92 mounted on the exterior surface of the trunk lid 24.

An eye-bolt 94, projecting forwardly from the trunk interior surface 86, defines an eye through which there extends a hook 96 which forms one end of a shaped rod 98. The other (free) end of the rod 98 terminates in another hook (or ring) 100 which lies in essentially the same plane as does the lug ring 88. Intermediate these two hooked ends, 96,100, the shaped rod is bent to form a planar, C-shaped section 102 with the closed end of that section being insertable with hand pressure into the lug ring 88 to produce a removeable, locking fit between the lug ring and C-shaped section. The rod material and cross-sectional size are selected so that the C-shaped section is resilient so that the aforementioned locking/removeable feature is present. Additionally, the length of the rod 98 is designed with the thickness of the beams 30,30' in mind to permit engagement of its free end hook 100 with the jaws 90 when the trunk lid 24 is in its locked position (FIG. 4). When the trunk lid 24 is locked against the base frame 28, any bicycle which is locked to the bicycle-supporting frame 42 is thereby effectively locked to the automobile 10.

Figure 6:
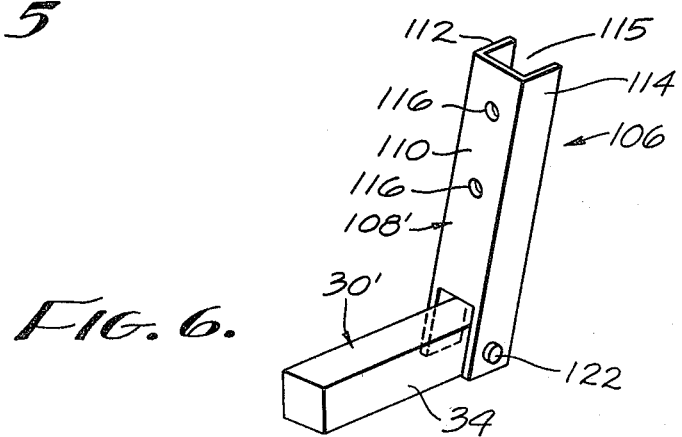
FIG. 6 is a perspective view of means for anchoring the embodiment of FIG. 5 to the underside of a trunk lid.

A second embodiment 104 of the invention is shown in FIGS. 5 and 6. That embodiment 104 provides most of the advantages characteristic of the described embodiment 26. In addition, the second embodiment 104 can be stowed against the underside of a closure thereby leaving the trunk space almost totally available for cargo.

Except as noted, components of the embodiment 104 of FIG. 5 which may be (but are not necessarily) identical to the components of the embodiment 26 of FIG. 1 are indicated by the same numerals.

With reference to FIGS. 5 and 6, the second embodiment 104 comprises a bicycle-support frame 42, an intermediate base frame 28, and anchoring means 106. In this general respect, this second embodiment 104 is essentially the same as the first-described embodiment 26. However, there is some divergence of the two locking means 40,106 to accommodate differences inherent in attachment of a carrier to a closure in one case and to another trunk-defining surface in the other case.

The anchoring means 106 comprises a pair of U-shaped brackets 108,108'. Each bracket 108,108' has an intermediate mounting wall 110 and side walls 112,114 defining a channel 115. The mounting wall 110 defines holes 116 for receiving rivets (not shown) extending therethrough for affixing the bracket 108 to the undersurface 118 of the trunk lid 24 (as at 120). The forward end 34 of each beam 30,30' of the base frame 28 extends upwardly into the channel 115 from behind and below the latter. A pin 122 extends transversely through aligned holes (not shown) in each paired beam 30,30' and bracket 108,108' to pivotally interconnect each paired beam and bracket. Such pivoted interconnection permits the beam end which is connected to a bracket to pivot within the latter to assume the bicycle-supporting position shown in solid line in FIG. 5 or the stowed position shown in dotted outline in the same Figure. Additionally, the side flanges 112,114 serve to maintain forward/rearward alignment of the beams 30,30'. As is evident from FIG. 5, the base frame 28 need not be perfectly horizontal. In fact, the base frame can be somewhat canted to take advantage of, or at least to eliminate the need to specially modify, the internal design features of an automobile trunk.

The articulated carrier of FIG. 5 is rotated into and out of its bicycle carrying position as described with respect to the embodiment 26 of FIG. 1. However, in its stowed position, it is extended along and under the trunk lid 24 as shown in FIG. 5. When so extended, its forward end may be held against the trunk lid undersurface 118 by any suitable means such as a strap 124 attachable at its ends to the trunk lid.

From the foregoing, it will be understood that two preferred embodiments of the invention have been described for use with a vehicle having a cavity which is defined by contiguous wall members (including in some cases, a floor) and to which access is provided by an opening defined by free edges of those wall members. A closure which also serves to define the cavity is hingedly connected to the vehicle adjacent to one side of the opening for engagement with the free edges when normally closing the opening. The described load carrier broadly comprises a base frame which, when the carrier is in its load-supporting position, extends across and is supported by, the wall members along their free edges distal from the hinged side of the closure. As so disposed, the base frame has a first end extending into the cavity and a second end extending away from the latter. A load-supporting frame which is disposed in a generally upright position when supporting a load is connected at its lower end to the second end of the base frame and carries engagement means on its upper end for retaining a load against the load-supporting frame. Anchoring means are interconnected to the base frame's first end and interiorly of the trunk, i.e., to one or more interior surfaces of the wall members (which includes the floor, as noted) or to the undersurface of the closure. Locking means function to lock the closure in its normally closed position when the carrier is not assembled for use, but to lock the closure against the base frame when the carrier is in its load-supporting position. As described, the carrier, in its broadest mode, may be assembled and dismantled as the occasion demands. That is, the base and load-supporting frames may be connected to each other and to the anchoring means as the need arises for a load carrier, yet they can be disconnected from each other and from the anchoring means for separate storage anywhere. However, in the preferred embodiments, pivotal connections between these pairs of components are utilized to enable the carrier to be stored as a unit within the cavity. In one configuration, the carrier components are folded against each other for storage, but in a second configuration, they can be stored in extended or generally aligned position. Stabilizing means may be utilized to connect the upper end of the load-supporting frame to the trunk lid at its hinged end.

All embodiments have in common: the use of locking means for locking the closure against the carrier's base frame when the carrier is assembled for load carrying; the use of anchoring means connecting the end of the base frame within the cavity to an interior surface of the latter; and the disposition of the base frame across and upon an edge of the cavity-defining wall members when the carrier is in its load-supporting position. These common characteristics, as is evident from the Figures, serve to uniquely support and counterbalance the weight of a load while permitting the locking of a carrier-supported load to a vehicle by locking it to the carrier.

To further enhance the usefulness of the described preferred embodiments in which the load-supporting frames are pivotally connected to their related base frames, it is preferred to utilize stabilizing or restraining means which permit controlled rotation of the load-supporting frame about its lower pivot point so that the latter can be raised to, or lowered from, its load-supporting position by manipulation of the stabilizing means. The described adjustable stabilizing means facilitates the raising and lowering of loads as will become apparent from the following description and reference to FIG. 1 in which the numeral 126 designates the adjustble stabilizing means. The latter 126 comprises a strap 128 which is affixed at its one end to a buckle 130, passes through a slot in a claw 132, doubles back on itself to pass through the eye-bolt 76 connected to the cross-member 52, and doubles back on itself again to pass frictionally through the buckle and leave its other (or free) end 134 projecting therefrom. The claw 132 is adapted to grip the forward edge of the closure 24 when the strap is tightened.

By appropriate adjustment of the adjustable stabilizing means 126, the load-supporting frame 42 can be raised or lowered, in a controlled manner, about its pivotal connection with the base frame 28 as shown by the arrow B in FIG. 2. When the load-supporting frame 42 is at its lowest position, a load can be attached to it before it is raised to its normal load-carrying position. Thus, loads which are too heavy to lift physically vertically onto the carrier can be readily raised in this manner. The lowering of loads is similarly facilitated. For further aid in lifting and lowering of loads onto or from the carrier, pulleys or pulley-like arrangements of various kinds which provide a mechanical advantage greater than 1:1 can be substituted for the described stabilizing means 126.

From the foregoing description, it will be understood that a significant advantage in the raising and lowering of loads is produced by the complementing combination of pivotal connections between load-supporting and base frames and of the adjustable stabilizing means.

As will be understood by those skilled in the art to which this invention pertains, various changes may be made in the invention without departing materially therefrom. For example, the anchoring means may be pivotally connected to the interior of the trunk. Additionally, a load-supporting frame may be pivotally connected to a base frame so that the former is rotatable into a position overlying, but spaced from, a trunk lid with, e.g., rubber-ended stops being used as spacers. When a carrier is in that overlying position, the trunk lid and/or the deck of a vehicle would serve to support a load. It is also possible to space the base frame of a carrier above the rear wall of a vehicle by supporting it on supporting elements mounted within a trunk. Such supporting elements would, in effect, constitute an inner wall which would be equivalent to a vehicle's rear wall.

I claim:

1. A load carrier for use with a vehicle having a cavity defined by interior surfaces of contiguous wall members and by a closure having an undersurface for closing an opening in said vehicle which provides access to said cavity and which is defined by free edges of said wall members, said closure being hingedly connected to said vehicle along one side of said closure and of said cavity, said load carrier comprising:

a base frame having a first and a second end and, when said load carrier is in its load-supporting position, extending generally horizontally across and supported by said free edges of said wall members distal from said one side of said closure to overhand both sides of said free edges so that said first and second ends of said base frame extend into, and away from, said cavity, respectively, said base frame comprising rigid members;

load-supporting means connected to said second end of said base frame in a generally upright position when said load carrier is in said load-supporting position;

anchoring means connected to said first end of said base frame and to at least one said interior surface of said wall members or to said undersurface of said closure for anchoring said carrier to said vehicle; and locking means carried on said vehicle for locking said closure against said free edges of said wall members to close said opening when said load carrier is not in said load-supporting position and for locking said closure against said base frame when said load carrier is in said load-supporting position.

2. The load carrier of claim 1 wherein said locking means comprises:
actuatable jaw means carried on said undersurface of said closure for engagement with
a ring mounted within said cavity to lock said closure against said free edges of said wall members; and
a shaped rod having a first end pivotally connected to one of said interior surfaces of said cavity, a second end shaped and disposed for locking engagement with said jaw means when said load carrier is in its load-supporting position, and a C-shaped section formed intermediate said first and second ends for receipt by said ring to position said shaped rod for engagement of said second end with said jaw means.

3. The load carrier of claim 1 wherein said load-supporting means comprises:
a load-supporting frame connected at its lower end to said base frame; and
load-engaging means carried on the upper end of said load-supporting frame for supporting a load against said load-supporting frame.

4. The load carrier of claim 1 wherein said base frame is pivotally connected to each of said load-supporting means and said anchoring means to permit retraction of said load carrier into said cavity for storage, as a unit, therein.

5. The load carrier of claim 1 which further includes:
stabilizing means attached to said load-supporting means and to said vehicle for maintaining said load-supporting means in said generally upright position.

6. A load carrier for use with a vehicle having wall members defining a trunk and defining an opening providing access to said trunk, said opening being closable by a trunk lid hingedly connected to said vehicle adjacent to a first edge of said trunk and lockable to said vehicle adjacent to a second edge of said trunk distal from said first edge, said carrier comprising:
a base frame having a first and a second end and comprising rigid members;
a load-supporting frame pivotally connected at one end to said second end of said base frame;
engagement means carried by said load-supporting frame adjacent to its other end for engagement with a load to support said load against said load-supporting frame;
anchoring means pivotally connected to said first end of said base frame and connected interiorly of said trunk for anchoring said base frame to said wall members or to said trunk lid,
said carrier being extendable from a stored position within said trunk into a load-supporting position (a) to dispose said base frame generally horizontally across, and for support upon, said second edge of said trunk so that said first end extends into said trunk and said second end overhangs the end of said vehicle adjacent to said second edge of said trunk and (b) to dispose said load-supporting frame in a generally upright position; and locking means carried on said vehicle for locking said trunk lid in engagement with said second edge of said trunk when said carrier is in said stored position and for locking said trunk lid against said base frame when said carrier is in said load-supporting position.

7. The carrier of claim 6 wherein said anchoring means is connected to an undersurface of said trunk lid and said carrier is retractable into said trunk for storage along said undersurface of said trunk lid.

8. The carrier of claim 6 wherein said anchoring means is connected to said wall members and said carrier is retractable into said trunk for storage in a folded position.

9. The carrier of claims 6, 7 or 8 wherein said load-supporting frame is hinged intermediate its ends for facilitating retraction of said carrier into said trunk.

10. The carrier of claim 6 wherein said one end of said load-supporting frame rests on, and is supported by, said base frame.

11. The carrier of claim 6 which further includes:
stabilizing means attached to said load-supporting frame and to said vehicle for maintaining said load-supporting frame in said generally upright position.

12. The carrier of claim 6 wherein said locking means comprises:
actuatable jaw means carried on an undersurface of said trunk lid for engagement with
a ring mounted within said trunk to lock said trunk lid against said second edge of said trunk in a normally closed position;
a shaped rod having a first end pivotally connected to one of said wall members interiorly of said trunk, a second end shaped and disposed for locking engagement with said jaw means when said load carrier is in said load-supporting position, and a C-shaped section formed intermediate said first and second ends for receipt by said ring to position said shaped rod for engagement of said second end with said jaw means.

13. A load carrier for use with a vehicle having wall members defining a trunk and defining an opening providing access to said trunk, said opening being closable by a trunk lid hingedly connected to said vehicle adjacent to a forward edge of said trunk and lockable to said vehicle adjacent to a rearward edge of said trunk, said carrier comprising:
a base frame having a first and a second end, said base frame resting upon and extending across said rearward edge of said trunk in a generally horizontal position when said carrier is in its load-supporting position, said first end of said base frame extending into said trunk and said second end overhanging the rearward end of said vehicle, said base frame being rigid;
a load-supporting frame pivotally connected at one end to said second end of said base frame and resting upon said base frame in a generally upright position when said carrier is in said load-supporting position, said load-supporting frame being hinged intermediate its ends to facilitate retraction of said carrier into said trunk and having a cross-member disposed adjacent to its other end, said cross-member extending laterally of said load-supporting frame to provide lateral extensions thereto;
engagement means carried by said load-supporting frame adjacent to said other end for engagement with a load to support said load against said load-supporting frame;

anchoring means pivotally connected to said first end of said base frame and connected interiorly of said trunk adjacent to the rearward end of said trunk for anchoring said base frame to said wall members or to said trunk lid;

stabilizing means attached to said load-supporting frame and to said vehicle for maintaining said load-supporting frame in said generally upright position; and locking means carried on said vehicle for locking said trunk lid in engagement with said rearward edge of said trunk when said carrier is in its retracted position within said trunk and for locking said trunk lid against said base frame when said carrier is in said load-supporting position.

14. The carrier of claim 13 wherein said anchoring means is connected to an undersurface of said trunk lid and said carrier is retractable into said trunk for storage along said undersurface of said trunk lid.

15. The carrier of claim 13 wherein said anchoring means is connected to said wall members and said carrier is retractable into said trunk for storage in a folded position.

16. The carrier of claim 13 wherein said locking means comprises:

actuatable jaw means carried on an undersurface of said trunk lid for engagement with a ring mounted within said trunk to lock said trunk lid against said rearward edge of said trunk in a normally closed position; and a shaped rod having a first end pivotally connected to one of said wall members interiorly of said trunk, a second end shaped and disposed for locking engagement with said jaw means when said load carrier is in said load-supporting position, and a C-shaped section formed intermediate said first and second ends for receipt by said ring to position said shaped rod for engagement of said second end with said jaw means.

17. The carrier of claim 13 wherein said engagement means comprises:

at least one flexible hanger attached at one end to said cross-member and forming a loop at its other end, each said hanger being extendible around said load so that each said loop can be slipped over one said lateral extension of said cross-member to retain and support said load against said load-supporting frame.

* * * * *